Dec. 11, 1945.                W. T. EPPLER                2,390,785
                                CONVEYER
                            Filed May 8, 1944
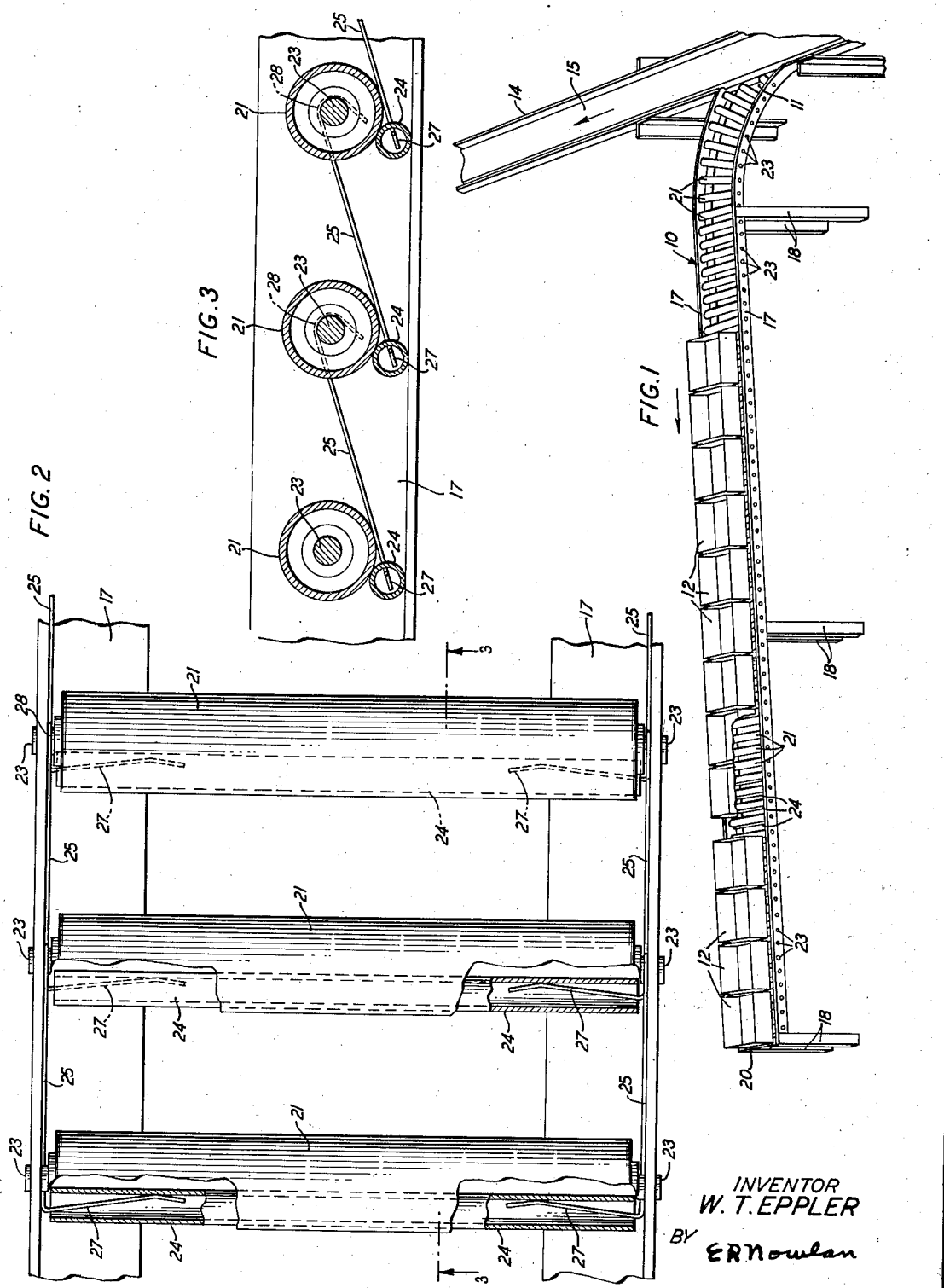
INVENTOR
W. T. EPPLER
BY E. R. Nowlan
ATTORNEY Patented Dec. 11, 1945

2,390,785

UNITED STATES PATENT OFFICE 2,390,785

CONVEYER

Walter T. Eppler, Cranford, N. J., assignor to Western Electric Company, Incorporated, New York, N. Y., a corporation of New York Application May 8, 1944, Serial No. 534,549

9 Claims. (Cl. 193—35)

This invention relates to conveyers, and more particularly to snubber structures therefor.

In conveyer systems there are frequently spur lines extending in various directions from a main conveyer to direct trays or articles to desired locations. Ofttimes the spurs are of the roller conveyer type and cause the trays or articles to travel, by the aid of gravity, to the ends thereof. It has been found advantageous to check the travel of such trays or articles prior to their reaching the ends of the spurs, so that the trays may be more readily removed without possible injury and with minimum effort.

An object of the invention is to provide a conveyer having a snubber therein which is simple in structure and highly efficient in checking the advancement of trays or articles thereon.

With this and other objects in view, the invention comprises a conveyer, having a frame with rollers rotatably mounted at spaced positions longitudinally thereof, and an element disposed at one side of one of the rollers and in engagement therewith to hold the roller for free rotation in one direction but against rotation in the other direction.

Other objects and advantages will be apparent from the following detailed description when considered in conjunction with the accompanying drawing, wherein Fig. 1 is a fragmentary perspective view of a portion of a conveyer system illustrating the invention;

Fig. 2 is an enlarged fragmentary top plan view of a portion of the conveyer, portions thereof being broken away, and Fig. 3 is a fragmentary sectional view taken along the line 3—3 of Fig. 2.

Referring now to the drawing, reference numeral 10 indicates generally a conveyer which in reality is a spur line adapted to receive, at an entrance end 11 thereof, trays 12 or other articles from a main conveyer 14. The main conveyer 14 includes a continuously travelling endless belt 15, the upper or supporting portion of which is travelling in the direction of the arrow. If desired, suitable means may be provided to direct the trays onto the conveyer 10.

The conveyer 10 is composed of a frame including spaced angle members 17 supported by legs 18 so that the trays 12 will travel, by the aid of gravity, from the entrance end 11 to the exit end 20. A multiplicity of rollers 21 is disposed at spaced positions between the vertical portions of the angle members 17 and supported upon spindles 23.

In the present embodiment it is desirable to check the forward travel of the trays 12 a given distance in advance of the exit end 20 of the conveyer 10. The means for accomplishing this result includes a selected number of snubbers or retarding elements 24, which in the present embodiment are tubular and are formed of suitable material, preferably metal. Each element 24 is provided with a pair of retaining members 25 of the contours illustrated in Figs. 2 and 3. The members 25 are preferably formed of music wire and are bent, as at 27, to project into the ends of the elements 24, their other ends provided with hook portions to extend about the spindles of their next adjacent rollers, as illustrated in Fig. 3. The central portions of the retaining members 25 lie closely adjacent the vertical portions of the angle members 17 and are thus held against displacement, holding their respective elements 24 partially wedged between their respective rollers 21 and the lateral portions of the angle members 17.

In the present embodiment the elements 24, resiliently held in place by their retaining members 25, are disposed adjacent four of the rollers 21 at a position in the conveyer 10 which is spaced from the exit end thereof, this position indicated by the broken trays illustrated in Fig. 1. During the operation of the conveyer 15 and the feeding of trays 12 to the conveyer 10, the first tray will travel upon the freely rotatable rollers 21 until it reaches the rollers associated with the elements 24. The elements 24, due to their relationship with their respective rollers and the lateral members of the angle members 17, will hold these rollers against counterclockwise rotation and will thus stop the first tray against further movement on the conveyer. This will leave a portion of the conveyer adjacent the exit end empty. However, as the trays continue to travel on the conveyer 10, the second tray, for example, will strike the first tray and move it a short distance on the held rollers, the third tray striking the second tray will remove the first tray a further distance, until, finally, after repeated movements by successive trays, the first tray will be moved beyond the held rollers and will thus be allowed to continue its travel to the exit end 20. The elements 24 will, therefore, hold their rollers to retard the trays which will eventually pile up a given distance from the exit end 20 so that any one of the trays adjacent the exit end may be readily removed. Furthermore, the travel of the trays from the snubbed rollers to the exit end is short and before any one of the trays has time to increase its speed of travel, it has reached the exit end 20 or the next adjacent preceding tray.

The elements 24 have been defined as being capable of stopping rotation of their respective rollers. It should be understood, however, that if the operator wishes to move any of the trays, which might be upon the rollers held against counterclockwise rotation by the elements 24, the tray may be readily moved toward the entrance end 11 of conveyer causing the rollers 21 rotated freely in this direction. It will be apparent, by viewing Fig. 3, that counterclockwise rotation of the rollers 21 tends to further wedge the elements 24 between their respective rollers and the lateral portions of the angle members 17, but clockwise rotation of the rollers will tend to move the elements 24 out of this wedging position and thus free the rollers for rotation in this direction. The resilient ends 27, however, hold the elements 24 in readiness to check the forward travel of the trays toward the exit end 20.

The extent of this snubbing action can be varied by varying the number of elements 24 employed. It was previously described how subsequent trays, in striking the leading tray, eventually move it beyond the area in which the elements 24 are disposed, and the holding effect of this area may be greatly varied by increasing or decreasing the number of elements employed as well as their locations on the conveyer. Furthermore, although the trays strike each other in piling up as illustrated in Fig. 1, the shock given each tray is reduced from that which it would receive, if the trays continued freely to the fixed stop at the exit end, due to the fact that the leading trays, or those resting upon the snubbed rollers, may be moved by the repeated striking of the trays added to the group. With this arrangement only a few trays (one to four) will be located at the exit end and the operator may remove them singly with little effort and without possible injury.

Although specific improvements of the invention have been shown and described, it will be understood that they are but illustrative and that various modifications may be made therein without departing from the scope and spirit of this invention as defined by the appended claims.

What is claimed is:

1. In a conveyer, a frame having an entrance end and an exit end, rollers rotatably mounted at spaced positions longitudinally of the frame, and an elongate element extending longitudinally of one of the rollers and in engagement therewith and with the frame to hold the said roller for free rotation in one direction but against rotation in the other direction.

2. In a conveyer, a frame having an entrance end and an exit end, rollers rotatably mounted at spaced positions longitudinally of the frame, an elongate element extending longitudinally of one of the rollers, and means to normally urge the element in engagement with the said roller and frame to hold the said roller for free rotation in one direction but against rotation in the other direction.

3. In a conveyer, a frame having an entrance end and an exit end, rollers rotatably mounted at spaced positions longitudinally of the frame, an elongate element extending longitudinally of one of the rollers, and resilient means disposed at the ends of the element to normally urge the element in engagement with the roller and frame to hold the said roller for free rotation in one direction and against rotation in the other direction.

4. In a conveyer, a frame having an entrance end and an exit end, rollers rotatably mounted at spaced positions longitudinally of the frame, a tubular element extending longitudinally of one of the rollers, and resilient members disposed in the ends of the element to normally urge the element in engagement with the roller and frame to hold the said roller for free rotation in one direction and against rotation in the other direction.

5. In a conveyer, a frame having an entrance end and an exit end, rollers disposed at spaced positions longitudinally of the frame, means carried by the frame to rotatably support the rollers, a snubber element, and means carried by the supporting means for one of the rollers to hold the element in engagement with another roller to hold the last mentioned roller against rotation in one direction but free for rotation in the other direction.

6. In a conveyer, a frame having an entrance end and an exit end, rollers disposed at spaced positions longitudinally of the frame, means carried by the frame to rotatably support the rollers, a snubber element, and resilient members removably carried by the supporting means for one of the rollers to hold the element in engagement with another roller to hold the last mentioned roller against rotation in one direction but free for rotation in the other direction.

7. In a conveyer, a frame having spaced members with side and bottom portions, rollers disposed at spaced positions longitudinally of the frame and given distances from the said bottom portions, an elongate element having a thickness greater than the distance between the rollers and the bottom portions of the frame and disposed upon the latter adjacent one of the rollers, and resilient means to urge the element in a wedging position between the said roller and the bottom portions to hold the said roller against rotation in one direction and to cause the element to be moved out of the wedging position to free the said roller for movement in the opposite direction.

8. In a conveyer, a frame having spaced members with side and bottom portions, rollers disposed at spaced positions longitudinally of the frame and given distances from the said bottom portions, a tubular element, substantially equal in length to the length of the rollers and having a thickness greater than the distance between the rollers and the bottom portions, disposed upon the latter adjacent one of the rollers, and resilient means to urge the element in a wedging position between the said roller and the bottom portions to hold the said roller against rotation in one direction and to cause the element to be moved out of the wedging position to free the said roller for movement in the opposite direction.

9. In a conveyer, a frame having spaced members with side and bottom portions, rollers disposed at spaced positions longitudinally of the frame and given distances from the said bottom portions, a tubular element, substantially equal in length to the length of the rollers and having a thickness greater than the distance between the rollers and the bottom portions, disposed upon the latter adjacent one of the rollers, and resilient members carried by the frame and having fingers extending into the ends of the element to urge the element into a wedging position between the said roller and the bottom portions to hold the said roller against rotation in one direction and to cause the element to be moved out of the wedging position to free the said roller for movement in the opposite direction.

WALTER T. EPPLER.